United States Patent

Stowe, Jr.

[11] Patent Number: 5,039,499
[45] Date of Patent: Aug. 13, 1991

[54] PROCESS FOR DESULFURIZATION OF SULFUR DIOXIDE-CONTAINING GAS STREAMS

[75] Inventor: Donald H. Stowe, Jr., Beaver, Pa.

[73] Assignee: Dravo Lime Company, Pittsburgh, Pa.

[21] Appl. No.: 188,254

[22] Filed: Apr. 29, 1988

[51] Int. Cl.⁵ ............................................. C01B 17/00
[52] U.S. Cl. ................................................... 423/242
[58] Field of Search ........................................ 423/242

[56] References Cited

U.S. PATENT DOCUMENTS

| | | | |
|---|---|---|---|
| 3,914,378 | 9/1975 | Selmeczi | 423/242 |
| 3,919,393 | 11/1975 | Selmeczi | 423/242 |
| 3,919,394 | 11/1975 | Selmeczi | 423/242 |
| 4,041,978 | 3/1977 | Klein et al. | 423/242 |
| 4,046,856 | 9/1977 | Itoo et al. | 423/166 |
| 4,193,971 | 3/1980 | Kawamata et al. | 423/242 |
| 4,246,245 | 1/1981 | Abrams et al. | 423/242 |
| 4,804,523 | 2/1989 | Abrams et al. | 423/242 |

OTHER PUBLICATIONS

The Handbook of Chemistry and Physics, 53rd edition Weast ed. p. F-169.

Primary Examiner—Olik Chaudhuri
Assistant Examiner—Ken Horton
Attorney, Agent, or Firm—Armstrong, Nikaido, Marmelstein, Kubovcik & Murray

[57] ABSTRACT

A process for desulfurizing sulfur dioxide-containing gases wherein the sulfur-containing gases are contacted with an aqueous solution of magnesium hydroxide in a wet scrubber, wherein magnesium sulfite and magnesium bisulfite are formed, a portion of spent scrubbing medium is subjected to oxidation to convert the magnesium sulfite and the magnesium bisulfite therein to magnesium sulfate, the oxidized product is contacted with a magnesium-containing lime slurry to obtain magnesium hydroxide and calcium sulfate, calcium sulfate is separated from the resulting product and the magnesium hydroxide is recycled to the scrubber.

10 Claims, 2 Drawing Sheets

PROCESS FOR DESULFURIZATION OF SULFUR DIOXIDE-CONTAINING GAS STREAMS

FIELD OF THE INVENTION

The present invention is directed to a process comprising contacting a sulfur dioxide-containing gas stream with an aqueous solution of magnesium hydroxide in a wet scrubber to remove sulfur dioxide therefrom, subjecting a portion of the spent scrubbing medium to oxidation and then treating the oxidized product with a magnesium-containing lime slurry to obtain regenerated magnesium hydroxide for recycle to the scrubber.

BACKGROUND OF THE INVENTION

The present process is an improvement over the processes described in U.S. Pat. Nos. 3,919,393 and 3,919,394, which are assigned to the assignee of the present invention. In those processes, an improvement in sulfur dioxide removal from flue gases was provided, where the addition of the specified amount of magnesium components to a lime slurry scrubbing system resulted in increased removal of the sulfur oxides. In those processes, a calcium oxide aqueous slurry containing a specified amount of magnesium components was used as the scrubbing medium in a wet scrubbing unit. While those improved processes work well and are commercially utilized, problems can be associated with the use of aqueous slurries in wet scrubbing units. In such slurries, suspended solids are present which have a tendency to accumulate not only in the holding tanks for the slurry but also in pipelines and nozzles, which can result in plugging. In addition, those processes tend to produce a sludge for disposal that has relatively poor dewatering characteristics, and sufficient dewatering capacity has to be provided in the design of a system using those processes to accommodate the poor dewatering characteristics of the sludge produced.

In U.S. Pat. No. 4,014,978, a method for removing sulfur dioxide from flue gases is described using a solution containing excess calcium or magnesium bicarbonate. Reaction of the sulfur dioxide with the bicarbonates produces soluble bisulfites, with oxidation of the resultant solution effected. The oxidized solution is then contacted with an alkaline earth metal carbonate to regenerate a bicarbonate that is recycled to the scrubbing unit. Precipitated sulfate and other solids are separated from the regenerated bicarbonate solution.

U.S Pat. No. 4,193,971, Kawamata et al. contact an aqueous slurry containing magnesium hydroxide and gypsum with an $SO_2$-containing gas to fix the $SO_2$ as magnesium sulfite, contact the resulting slurry with an oxidizing agent to convert the magnesium sulfite into magnesium sulfate, subject the aqueous slurry obtained to filtration, treat the magnesium sulfate with calcium hydroxide in the presence of gypsum crystals, as seed crystals, to obtain magnesium hydroxide and gypsum, and then recycle the latter slurry to the initial step.

The oxidation of effluent from a lime scrubbing process to convert sulfites and bisulfites for the purpose of easy separation from the aqueous medium as precipitated sulfates is a known procedure. In U.S. Pat. No. 4,046,856, for example, a slurry of a calcium compound, such as calcium hydroxide or calcium carbonate, has a soluble magnesium compound added thereto, for reaction with sulfur dioxide in a scrubbing unit, with the effluent from the scrubbing unit oxidized to form sulfates. Sulfuric acid is also added to the oxidizing medium for pH control. The discharge from the oxidizer is passed to a thickener in which gypsum is separated, and the magnesium compounds returned to the tanks wherein a calcium slurry is formed for passage through the scrubbing unit, the slurry composed mainly of calcium hydroxide, calcium sulfate and magnesium hydroxide in water.

Abrams et al. in U.S. Pat. No. 4,246,245 contact a $SO_2$-containing gas with a hydrated lime to remove $SO_2$ therefrom. In one embodiment, a type S hydrated dolomitic lime is used as a source of magnesium sulfite, resulting in the formation of magnesium sulfite-bisulfite. A sidestream of the latter is oxidized to magnesium sulfate and the magnesium sulfate is converted to magnesium hydroxide, which is combined with the wet scrubber effluent to provided magnesium sulfite.

SUMMARY OF THE INVENTION

The present process uses an aqueous solution of magnesium hydroxide to remove $SO_2$ from a flue gas stream, in a wet scrubber, with spent solution regenerated by the addition of a magnesium-containing lime slurry, after prior oxidation of the spent solution, such that calcium sulfate is formed, which is separated, and magnesium hydroxide regenerated in an aqueous solution which is returned to the scrubber.

DETAILED DESCRIPTION OF THE INVENTION

Figure 1:
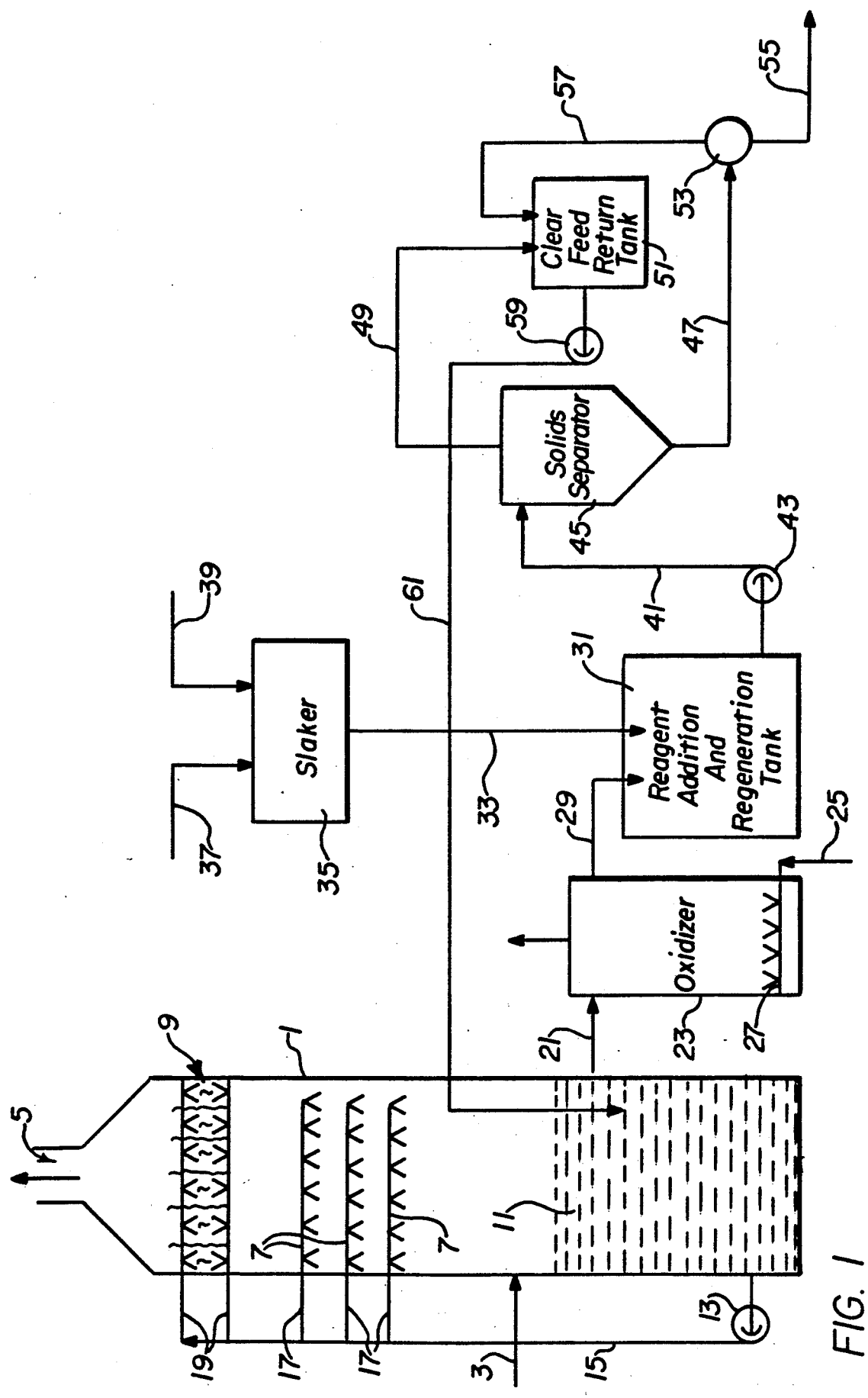
FIG. 1 is a schematic illustration of an embodiment of the present invention.

Wet scrubbing units for the removal of sulfur dioxide from flue gases are known, in which the flue gas is contacted with a countercurrent flow of a scrubbing liquid. In the present process, liquid charged to the wet scrubbing unit is an aqueous solution of magnesium hydroxide. The magnesium hydroxide, in the scrubbing unit is converted to magnesium sulfite and the magnesium sulfite so formed is further converted, by contact with sulfur dioxide, under acidic conditions, to magnesium bisulfite, by the general formula:

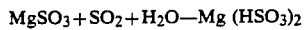

$$MgSO_3 + SO_2 + H_2O \rightarrow Mg(HSO_3)_2$$

The scrubbing solution should have a magnesium ion content of between about 5000 to about 15000 parts per million, with fresh or recycled magnesium hydroxide solution added to the scrubber to replenish that which is removed for oxidation and regeneration. In the scrubbing unit, the solution of scrubbing fluid should be at a pH of between about 4.5 to about 7.5 and preferably a pH of about 6.5

The scrubbing fluid is collected in the bottom of the scrubbing unit. A major portion thereof is recycled within the scrubbing unit for contact with further sulfur dioxide-containing gases, a portion may go for washing of the demisters and the remainder of the scrubbing fluid is withdrawn, as effluent, from the scrubbing unit so as to remove the sulfur components of magnesium sulfite and bisulfite therefrom and regenerate magnesium hydroxide for return to the scrubbing unit.

The portion of scrubber effluent that is not recycled or used to wash demisters is first contacted with an oxidizing gas, such as air, for example, at a temperature of about 25° to about 60° C., and an average contact time of about 1 to about 4 hours to convert soluble magnesium sulfite and magnesium bisulfite to magnesium sulfate. Such oxidation is characterized by the following equations:

$$Mg(HSO_3)_2 + \tfrac{1}{2}O_2 \rightarrow MgSO_4 + 2H^+$$

$$Mg(SO_3) + \tfrac{1}{2}O_2 \rightarrow MgSO_4$$

The oxidation decreases the pH of the effluent from the range of about 4.5 to about 7.5 to a lower value within the range of about 3.5 to about 5.5. The oxidized solution, which is now a sulfate-containing solution, is then passed to a reagent addition tank for contact with an aqueous slurry containing from about 15 to about 30 weight percent, preferably about 20 to about 25 weight percent, of fresh magnesium-containing lime. The magnesium-containing lime used to prepare the aqueous slurry for treatment of the oxidized scrubber effluent should contain about 1.5 to about 7 weight percent magnesium oxide, with the balance being calcium oxide. Preferably, a magnesium-containing lime having about 3 percent by weight of magnesium oxide is used.

The addition of the magnesium-containing lime, after conversion of the calcium and magnesium species to their corresponding hydroxides, to the oxidized effluent, which is at a pH of between 3.5 to 5.5, will basify the oxidized effluent and will result in the formation of insoluble calcium sulfate and magnesium hydroxide. The pH is increased to a value between about 9.0 to about 11.0, and the soluble magnesium sulfate is reacted with $Ca(OH)_2$, which results in precipitation of $CaSO_4$ and $Mg(OH)_2$ by the general equation:

$$MgSO_4 + Ca(OH)_2 \rightarrow Mg(OH)_2 + CaSO_4 \cdot 2H_2O$$

The amount of magnesium-containing lime required is that amount containing calcium stoichiometrically required to react with the magnesium sulfate. The magnesium-containing lime and the oxidized effluent are contacted for a period of time, for example, about 3 minutes to about 60 minutes, and a temperature of about 25° to about 60° C., sufficient to convert the magnesium sulfate to insoluble calcium sulfate and magnesium hydroxide.

A major portion of the magnesium hydroxide is separated from the precipitated calcium sulfate, such as by a cyclone separator, and the magnesium hydroxide passed to a return tank for recycle to the scrubbing unit. The separated calcium sulfate may be further dewatered by a centrifuge or other separating means prior to discharge as calcium sulfate, while reclaimed magnesium hydroxide suspension therefrom is also passed to a return tank. The reclaimed magnesium hydroxide suspension is then returned to the scrubbing unit for re-use in further scrubbing of sulfur dioxide gases.

Referring now to FIG. 1, an embodiment of the present invention is schematically illustrated. A scrubbing unit 1 has sulfur-containing gases charged thereto through line 3, and cleaned gases, after removal of sulfur-containing components, are discharged at exhaust means 5. A plurality of scrubbing unit sprayers 7 are provided within the scrubber 1, with a demister 9 between the scrubbing unit sprayers 7 and the exhaust means 5. The scrubbing unit 1 collects a supply of scrubbing fluid 11 in the lower portion thereof A pump 13, in line 15, directs a portion of the supply of scrubbing fluid 11, through line 15 to offtake lines 17 to the scrubbing unit sprayers 7, and offtake lines 19 to the demister 9. Such a scrubbing system for sulfur dioxide-containing combustion gases is conventional and known in the art.

According to the present invention, a portion of the scrubbing fluid from the scrubbing unit is treated so as to form and remove calcium components while recycling magnesium components back to the scrubbing unit. Scrubbing fluid is withdrawn from the scrubbing unit 1 through line 21 to an oxidizer 23, wherein the scrubbing fluid is contacted with an oxygen-containing gas, such as air, injected from a source, not shown, through line 25 and a plurality of discharge nozzles 27. Spent gas is removed overhead from oxidizer 23. After the desired contact time in the oxidizer 23, to convert sulfites and bisulfites of magnesium to magnesium sulfate, in a soluble form, the treated scrubbing fluid is discharged through line 29 to a reagent addition and regeneration tank 31, where the scrubbing liquor, which now comprises mainly magnesium sulfate and a minor amount of calcium sulfate is contacted with an aqueous slurry of magnesium-containing lime. A magnesium-containing lime slurry charged to the regeneration tank 31 through line 33, is formed in slaker 35 by the addition of magnesium-containing lime thereto through line 37, and water through line 39. The amount of water needed is only that sufficient to convert the magnesium and calcium compounds to their corresponding hydroxides and to form the desired aqueous slurry therewith. In the regeneration tank 31, the soluble magnesium sulfate is reacted with calcium hydroxide, which results in precipitation of calcium sulfate and magnesium hydroxide The regenerated aqueous medium is passed from the regeneration tank 31, through line 41, by means of a pump 43, to a solids separator 45, such as cyclone separator. Solids are discharged from the solids separator through line 47, while the aqueous suspension of magnesium hydroxide is discharged through line 49 to a return tank 51. The solids from line 47 may be further dewatered in a dewatering unit 53, such as a filter, with dewatered solids discharged from the system at line 55, while aqueous solution, or filtrate, from the filter 53 is returned to the clear feed return tank 51 through line 57. From the return tank 51, which contains magnesium hydroxide, scrubbing solution is returned to the scrubber 1, by means of a pump 59, through line 61.

Exemplary of the contents of the process streams in carrying out the process, as illustrated in FIG. 1, where gaseous emissions from a 650 Mw boiler are treated to remove sulfur dioxide, are as listed in Table I. In Table I, the gas entering the scrubbing unit is assumed to be at a flow rate of $1 \times 10^6$ ACFM, and 149° C., and containing the following, in pounds/hour:

$H_2O - 3.623 \times 10^5$
$SO_2 - 4.57 \times 10^4$ (2965 ppm)
$O_2 - 2.515 \times 10^5$
$N_2 - 5.024 \times 10^6$
$HCl - 1.857 \times 10^2$
$CO_2 - 1.434 \times 10^6$ The clean gas discharged from the scrubbing unit contains the following in pounds/hour:

$H_2O - 6.59 \times 10^5$
$SO_2 - 4.57 \times 10^2$ (28 ppm)
$O_2 - 2.50 \times 10^5$
$N_2 - 5.02 \times 10^6$ HCl — 9.3
$CO_2$ — $1.432 \times 10^6$ unslurries magnesium-containing lime may be withdrawn from the slaker 141 through line 147. From the

TABLE I

|  | At Valve 13 Line 17 Line 19 Line 21 | Line 29 | Line 33 | Line 41 | Line 47 | Line 49 | Line 55 | Line 57 | Line 61 |
|---|---|---|---|---|---|---|---|---|---|
| Liquor Composition (ppm) | | | | | | | | | |
| Magnesium ($Mg^{++}$) | 6000 | 6000 | 50 | 115 | 115 | 115 | 115 | 115 | 115 |
| Calcium ($Ca^{++}$) | 50 | 50 | 300 | 2853 | 2853 | 2853 | 2853 | 2853 | 2853 |
| Total Sulfite | 18465 | 50 | 10 | 10 | 10 | 10 | 10 | 10 | 10 |
| $SO_3 (SO_3^=)$ | 2046 | 0 | 10 | 10 | 10 | 10 | 10 | 10 | 10 |
| $HSO_3 (HSO_3^-)$ | 16419 | 50 | 0 | 0 | 0 | 0 | 0 | 0 | 0 |
| Sulfate ($SO_4^=$) | 4000 | 26100 | 1000 | 1880 | 1880 | 1880 | 1880 | 1880 | 1880 |
| Chloride ($Cl^-$) | 4000 | 4000 | 0 | 4000 | 4000 | 4000 | 4000 | 4000 | 4000 |
| $H_2O$ (pounds/hour) | (13) $9.42 \times 10^6$ (21) $2.79 \times 10^6$ | $2.79 \times 10^6$ | $1.76 \times 10^5$ | $2.9 \times 10^6$ | $2.79 \times 10^6$ | $2.51 \times 10^6$ | 31130 | $2.48 \times 10^5$ | $2.75 \times 10^6$ |
| pH | 6 | 3.5 | 12.5 | 10 | 10 | 10 | 10 | 10 | 10 |
| Solids Compositions (lbs/hr) | | | | | | | | | |
| $CaSO_4 2H_2O$ | 0 | 0 | 0 | 121598 | 121598 | 0 | 121598 | 0 | 0 |
| $Mg(OH)_2$ | 0 | 0 | 2922 | 43153 | 2922 | 40231 | 2922 | 0 | 40231 |
| $Ca(OH)_2$ | 0 | 0 | $5.34 \times 10^4$ | 898 | 0 | 898 | 0 | 0 | 898 |
| Total Flow Solids | 0 | 0 | $5.63 \times 10^4$ | 165649 | 124520 | 41129 | 124520 | 0 | 41129 |

Figure 2:
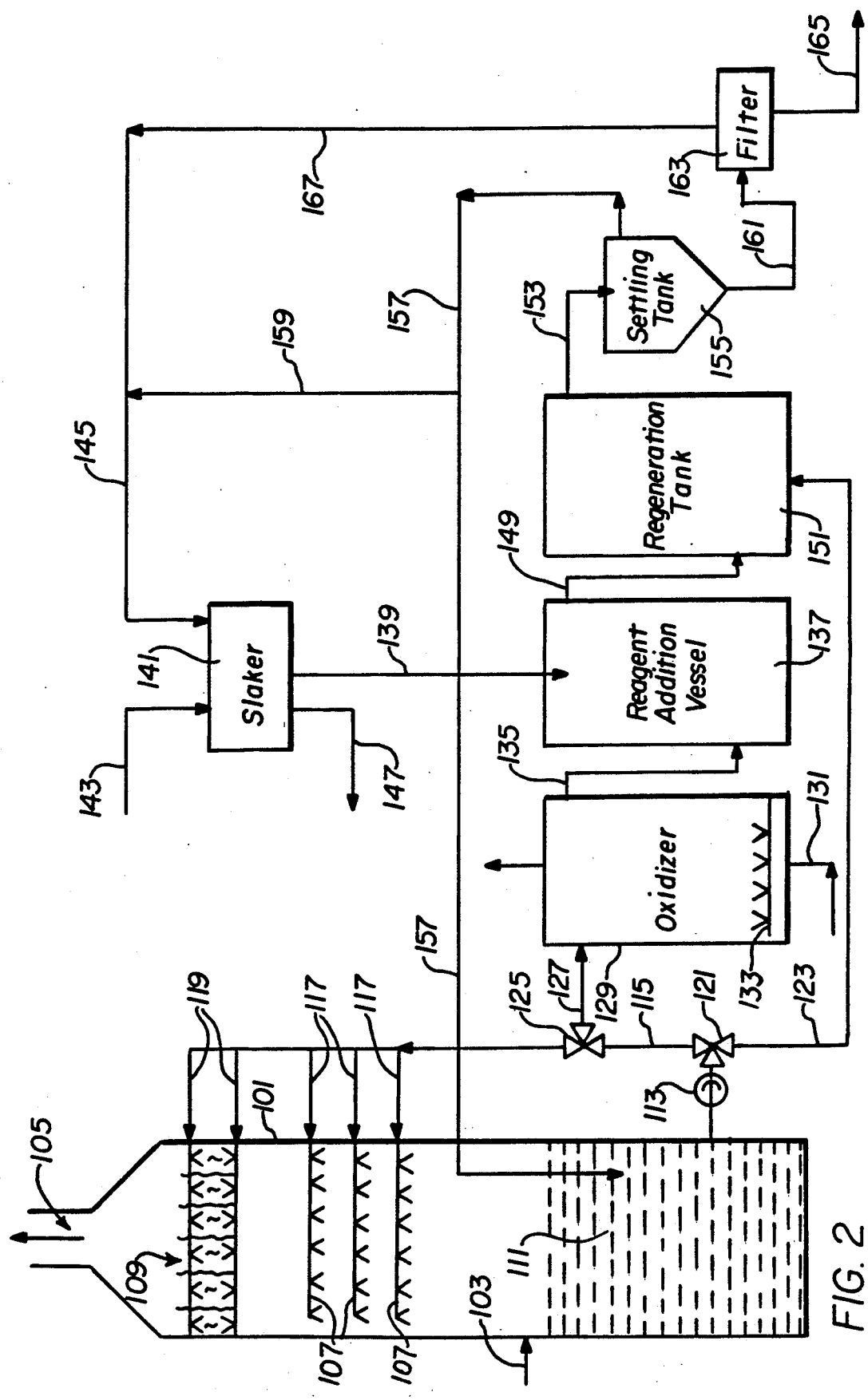
FIG. 2 is a schematic illustration of another embodiment of the present invention.

Another embodiment of the present invention is schematically illustrated in FIG. 2 wherein a bleed stream of spent scrubbing effluent is oxidized and a second portion used in a regeneration step. A scrubbing unit 101 has sulfur-containing gases charged thereto through line 103, and cleaned gases discharged at exhaust means 105. A plurality of scrubbing unit sprayers 107 are provided, along with a demister 109, in the scrubber unit 101. A supply of scrubbing fluid 111 collects in the lower portion of the scrubber unit 101, with a pump 113, in line 115 to offtake lines 117 to the sprayers 107, and offtake lines 119 to the demister 109. A valve 121 is provided in line 115 to direct a second portion of the flow therein through line 123, as hereinafter described. A further valve 125 is provided in line 115 which directs a bleed stream of the flow therefrom, through line 127 to an oxidizer 129. In the oxidizer 129, the bleed stream of scrubber effluent is contacted with an oxygen-containing gas, from a source not shown, through line 131, by means of nozzles or spargers 133. Spent gas is removed overhead from oxidizer 129. After the desired contact time in the oxidizer 129, the bleed stream of scrubber effluent is discharged through line 135 to a reagent addition vessel 137. To the reagent addition vessel there is also charged a magnesium-containing lime slurry through line 139, the magnesium-containing lime slurry formed in a slaker 141, by addition thereto of magnesium-containing lime through line 143 and aqueous recycle solution through line 145. Gritty material or reagent addition vessel 137, the aqueous mixture passes through line 149 to a regeneration tank 151. The second portion of the flow of scrubber effluent, from line 123, is also directed to the regeneration tank 151. After sufficient contact in the regeneration tank 151 to convert sulfites and bisulfites in the aqueous medium to sulfates, with production of calcium sulfate solids as a slurry in an aqueous solution of magnesium hydroxide, the mixture is passed through line 153, to a solids separator such as a settling tank 155 for separation of solids therefrom. The clean magnesium hydroxide solution is then returned to the scrubber unit 102 through line 157. A portion of the clean magnesium hydroxide solution may be directed through branch line 159 to line 145 for use in slaking additional magnesium-containing lime. The wet solids from the settling tank 155 are fed through line 161 to a filter 163. Solids are then discharged from the system through line 165. Filtrate, aqueous magnesium hydroxide solution, from the filter 163 is returned by line 167 to line 145 for use in slaking additional magnesium-containing lime.

Exemplary of the contents of the process streams in carrying out this alternative embodiment of the process, as illustrated in FIG. 2, where the gaseous emissions from a 65 Mw boiler are treated to remove sulfur dioxide, are listed in Table II. In Table II, the gas entering the scrubbing unit is that described relative to Table I:

TABLE II

|  | At Valve 113 Line 127 Line 123 | Recycle to Lines 117 & 119 | Line 135 | Line 139 | Line 149 | Line 153 | Lines 157 & 167 | Lines 161 & 165 |
|---|---|---|---|---|---|---|---|---|
| Liquor Composition (ppm) | | | | | | | | |
| Magnesium ($Mg^{++}$) | 6000 | 6000 | 6000 | 50 | 115 | 6004 | 6004 | 6004 |
| Calcium ($Ca^{++}$) | 50 | 50 | 50 | 300 | 2853 | 50 | 50 | 50 |
| Total Sulfite | 18465 | 18465 | 50 | 10 | 10 | 14337 | 14337 | 14337 |
| $SO_3 (SO_3^=)$ | 2046 | 2046 | 0 | 10 | 10 | 14287 | 14287 | 14287 |
| $HSO_3 (HSO_3^-)$ | 16419 | 16419 | 50 | 0 | 0 | 50 | 50 | 50 |
| Sulfate ($SO_4^=$) | 4000 | 4000 | 26100 | 1000 | 1880 | 3526 | 3526 | 3526 |
| Chloride ($Cl^-$) | 4000 | 4000 | 4000 | 0 | 4000 | 4000 | 4000 | 4000 |
| $H_2O$ | (113) $2.25 \times 10^7$ | $9.42 \times 10^6$ | $2.79 \times 10^6$ | $1.76 \times 10^5$ | $2.97 \times 10^6$ | $1.33 \times 10^7$ | (157) $1.32 \times 10^7$ | (161) 66522 |

TABLE II-continued

| | At Valve 113 Line 127 Line 123 | Recycle to Lines 117 & 119 | Line 135 | Line 139 | Line 149 | Line 153 | Lines 157 & 167 | Lines 161 & 165 |
|---|---|---|---|---|---|---|---|---|
| (pounds/hour) | (127) 2.79 × 10$^6$ | | | | | | (167) 36123 | (165) 30399 |
| pH | 6 | 6 | 3.5 | 12.5 | 10 | 6 | 10 | 10 |
| Solids Compositions (lbs/hr) | | | | | | | | |
| CaSO$_4$.2H$_2$O | 0 | 0 | 0 | 0 | 121598 | 121598 | 0 | 121598 |
| Mg(OH)$_2$ | 0 | 0 | 0 | 2922 | 43153 | 1045 | 0 | 1045 |
| Ca(OH)$_2$ | 0 | 0 | 0 | 5.34 × 10$^4$ | 898 | 898 | 0 | 898 |
| Total Flow Solids | 0 | 0 | 0 | 5.63 × 10$^4$ | 165649 | 123541 | 0 | 123541 |

The present invention provides a process for desulfurizing gases wherein calcium oxide is removed from the system effluent while magnesium hydroxide is formed and recycled to the scrubbing unit.

I claim:

1. A process for the desulfurization of sulfur dioxide-containing gases which comprises contacting a sulfur dioxide-containing gas stream with an aqueous solution of magnesium hydroxide in a wet scrubber, wherein said aqueous solution of magnesium hydroxide has a magnesium ion content of between about 5000 to about 15,000 parts per million, to remove sulfur dioxide therefrom; subjecting a portion of the spent scrubbing medium to oxidation and then treating the oxidized product with a magnesium-containing lime slurry to obtain magnesium hydroxide and calcium sulfate, the magnesium-containing lime used to prepare said slurry containing about 1.5 to about 7 weight percent magnesium oxide, with the balance being calcium oxide; separating calcium sulfate from the treated product and recycling magnesium hydroxide to the scrubber.

2. The process of claim 1 wherein said aqueous solution of magnesium hydroxide in said scrubber has a pH of between about 4.5 to about 7.5.

3. The process of claim 2 wherein said pH is about 6.5.

4. The process of claim 1 wherein the spent scrubbing medium contains magnesium sulfite and magnesium bisulfite.

5. The process of claim 4 wherein said magnesium sulfite and magnesium bisulfite are converted by oxidation to magnesium sulfate.

6. The process of claim 5 wherein said spent scrubbing medium after oxidation has a pH between about 3.5 to about 5.5.

7. The process of claim 1 wherein said magnesium-containing lime contains about 3 weight percent of magnesium oxide.

8. The process of claim 1 wherein the magnesium-containing lime is contacted with water prior to addition to said oxidized product to obtain the corresponding hydroxides.

9. The process of claim 7 wherein said magnesium-containing lime is contacted with water prior to addition to said oxidized product to obtain the corresponding hydroxides.

10. A process for the desulfurization of sulfur dioxide containing gases which comprises; contacting a sulfur dioxide containing gas stream with an aqueous solution of magnesium hydroxide in a wet scrubber, wherein said aqueous solution of magnesium hydroxide has a magnesium ion content of between about 5000 to about 15,000 parts per million and a pH of about 4.5 to about 7.5; subjecting a portion of the spent scrubbing medium containing magnesium sulfite and magnesium bisulfite to oxidation to convert said magnesium sulfite and said magnesium bisulfite to magnesium sulfate, the oxidation product obtained having a pH between about 3.5 to about 5.5; contacting said oxidation product with a magnesium-containing lime slurry, the magnesium-containing lime used to prepare said slurry containing from about 1.5 to about 7 weight percent of magnesium oxide, with the balance being calcium oxide; resulting in the regeneration of magnesium hydroxide and the formation of insoluble calcium sulfate; separating calcium sulfate from the regenerated magnesium hydroxide and then recycling the regenerated magnesium hydroxide to the scrubber.

* * * * *